(12) United States Patent
Van Der Steen

(10) Patent No.: US 7,556,436 B2
(45) Date of Patent: Jul. 7, 2009

(54) OPTICAL CONNECTOR SYSTEM

(75) Inventor: Hendrikus Petrus Gijsbertus Van Der Steen, Den Dungen (NL)

(73) Assignee: FCI, Versailles (FR)

( * ) Notice: Subject to any disclaimer, the term of this patent is extended or adjusted under 35 U.S.C. 154(b) by 0 days.

(21) Appl. No.: 10/588,014

(22) PCT Filed: Feb. 2, 2005

(86) PCT No.: PCT/EP2005/050449

§ 371 (c)(1),
(2), (4) Date: Jun. 19, 2008

(87) PCT Pub. No.: WO2005/076048

PCT Pub. Date: Aug. 18, 2005

(65) Prior Publication Data

US 2008/0253721 A1   Oct. 16, 2008

(30) Foreign Application Priority Data

Feb. 2, 2004   (NL) .................................... 1025381

(51) Int. Cl.
*G02B 6/38* (2006.01)
*G02B 6/40* (2006.01)
(52) U.S. Cl. ............... 385/60; 385/53; 385/56; 385/59; 385/78; 385/139
(58) Field of Classification Search ............... None
See application file for complete search history.

(56) References Cited

U.S. PATENT DOCUMENTS

| 5,121,454 A * | 6/1992 | Iwano et al. ............... 385/60 |
| 5,542,015 A | 7/1996 | Hultermans ............... 385/60 |
| 5,764,834 A | 6/1998 | Hultermans ............... 385/60 |
| 5,921,796 A | 7/1999 | Morlion et al. ............ 439/247 |
| 6,334,784 B1 | 1/2002 | Howard ................... 439/260 |
| 6,364,536 B1 * | 4/2002 | Chen et al. ............... 385/59 |
| 6,419,399 B1 | 7/2002 | Loder et al. .............. 385/53 |
| 6,461,035 B2 | 10/2002 | Meinlschmidt et al. ....... 374/5 |
| 6,769,814 B2 * | 8/2004 | Kiani et al. ............... 385/78 |
| 6,776,533 B2 * | 8/2004 | Gherardini ................ 385/59 |
| 7,073,953 B2 | 7/2006 | Roth et al. ............... 385/88 |
| 2001/0041030 A1 | 11/2001 | Chen et al. ............... 385/88 |
| 2002/0106162 A1 | 8/2002 | Loder et al. .............. 385/53 |
| 2003/0044125 A1 | 3/2003 | Kiani et al. .............. 385/78 |

FOREIGN PATENT DOCUMENTS

| EP | 0 485 196 A2 | 5/1992 |
| EP | 1 180 701 A1 | 2/2002 |
| EP | 1 275 993 A1 | 1/2003 |

* cited by examiner

*Primary Examiner*—Michelle R Connelly Cushwa
(74) *Attorney, Agent, or Firm*—Harrington & Smith, PC

(57) ABSTRACT

The invention relates to an optical connector system including a backpanel and at least one substrate, said substrate having at least one substrate housing assembly and said backpanel having at least one backpanel housing assembly for establishing an optical interface. The substrate housing assembly is attached to said substrate and includes a further housing slidably mounted in a z-direction of said substrate housing assembly. Accordingly no residual forces are exerted on the backpanel after establishment of the optical interface.

14 Claims, 6 Drawing Sheets

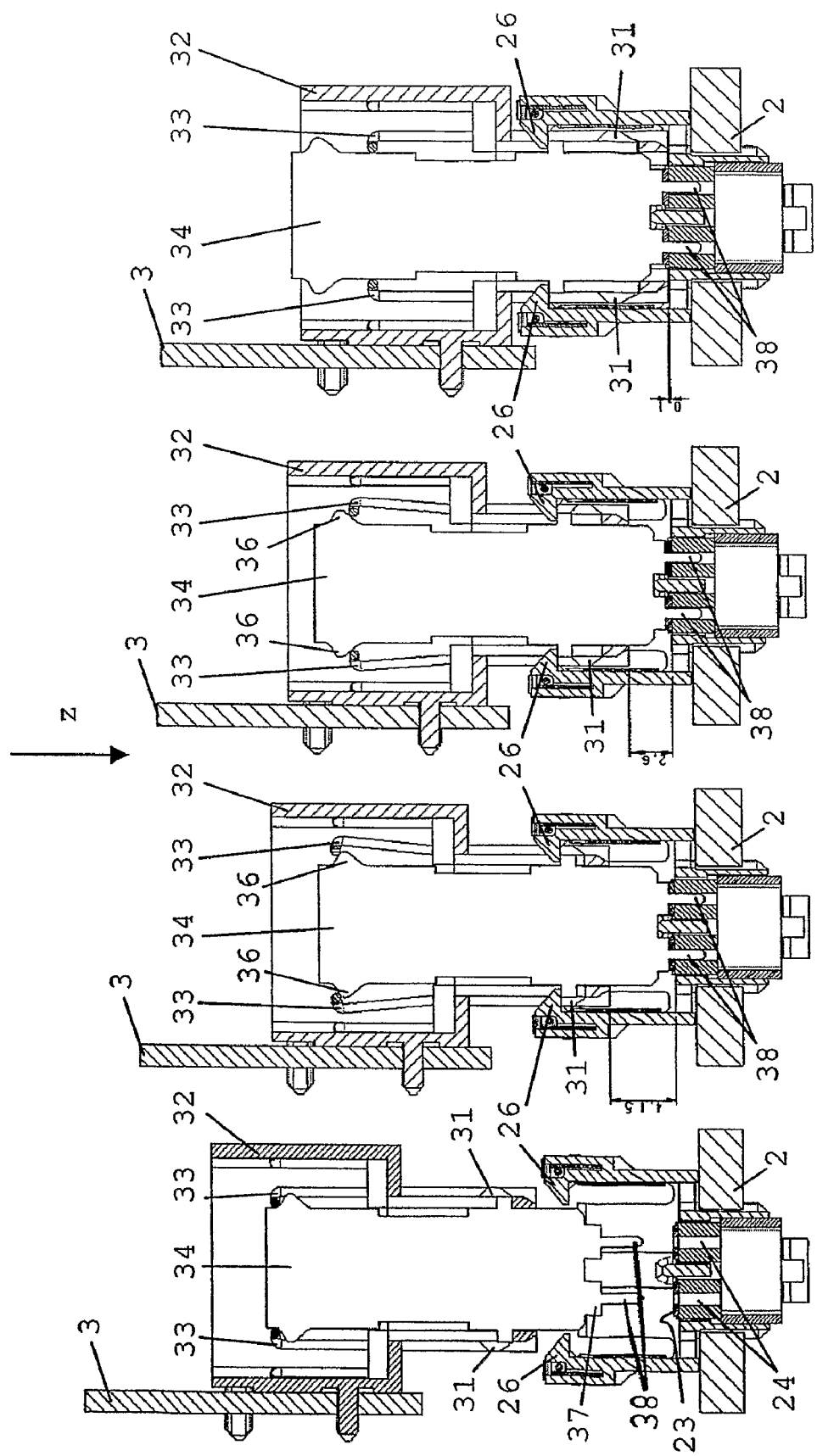

OPTICAL CONNECTOR SYSTEM

The invention relates to an optical connector system comprising a backpanel and at least one substrate, said substrate having at least one substrate housing assembly and said backpanel having at least one backpanel housing assembly for establishing an optical interface.

Optical connector systems typically comprise a backpanel with a plurality of system cards or substrates. These substrates usually comprise both optical and electrical connections to establish optical and electrical interfaces with corresponding elements on the backpanel. Alignment typically is of crucial importance to provide a low loss optical interface. Therefore it is often required for such optical connector systems that the optical interfaces are completed before the electrical connections are established, as the latter may otherwise disturb the alignment for the optical interface.

US2002/0106162 discloses a fibre optical connector system including a backplane housing assembly and a substrate housing assembly with longitudinal freedom of motion with respect to a substrate by means of a spring assembly. The substrate housing assembly is held tightly against the back of the backplane housing assembly by a constant spring bias provided by the spring assembly.

A drawback of such an optical connector system is that the total force that is exerted on the backpanel by spring loaded substrate housings is significant. Such a total force may typically exceed tens of kilograms, resulting in deformation of the backpanel that eventually may cause damaging of components and/or signal tracks on the backpanel.

It is an object of the invention to provide an optical connector system with a longitudinal freedom of motion at the substrate side to establish an optical interface while leaving substantially no residual forces after completion of the optical interface.

This object is achieved by providing an optical connector system characterized in that said substrate housing assembly is attached to said substrate and comprises a further housing slidably mounted in a z-direction of said substrate housing assembly. As the further housing is slidably mounted in the substrate housing assembly, progression of the substrate towards the backplane on connection does not result in a build-up of force on the backplane. Another advantage of the invention is that the substrate does not need to be modified to accommodate biasing means. Preferably, the substrate housing assembly comprises a biasing arrangement for said further housing adapted to release said further housing substantially after completion of said optical interface. This biasing arrangement allows for establishing the optical interface by applying force, while leaving insubstantial residual forces on the backpanel after completion of the optical interface. The further housing may be accommodated fully or in part within the substrate housing assembly.

In an embodiment of the invention the substrate housing assembly comprises a first interface part for establishing said optical interface with a second interface part at said backpanel housing assembly. The second interface part may be either integrated in said backpanel or said backpanel may comprise a cavity for forming said second interface part at said backpanel housing assembly. The first alternative allows for a backpanel without holes or cavities e.g. resulting in more routing freedom for optical and electrical signal tracks and less electromagnetic interference. The second alternative allows for the connection of optical cables or flexes in the backpanel housing assembly to provide optical connection with the components of the substrate.

In an embodiment of the invention the further housing comprises said first interface part. Preferably the further housing comprises at least one ferrule assembly for optical fibres at said first interface part and alignment elements to align said first interface part and said second interface part to provide a low loss optical connection.

Preferably the backpanel housing assembly and the substrate housing assembly comprise locking elements adapted to lock said housings after completion of said optical interface. The locking elements prevent the optical interface to be interrupted accidentally, e.g. if the electrical connections are established.

The invention is particularly advantageous in a system wherein said backpanel comprises one or more first electrical contacts and said substrate comprises one or more second electrical contacts and said optical connector system is further arranged to establish electrical connections between said first and second electrical contacts after establishment of said optical interface.

The invention further relates to a substrate housing assembly for a substrate adapted for mounting to a backpanel housing assembly of a backpanel to establish an optical interface for optical connection between said substrate and said backpanel. The substrate housing assembly is adapted to comprise a further housing with a mating side forming a first interface part for said optical interface, said further housing being slidably mountable in a z-direction of said substrate housing assembly. Preferably the substrate housing assembly comprises biasing means adapted to release said further housing after completion of said optical interface.

The invention will be further illustrated with reference to the attached drawings, which show a preferred embodiment according to the invention. It will be understood that the invention is not in any way restricted to this specific and preferred embodiment.

IN THE DRAWINGS

FIG. 1 schematically shows a part of an optical connector system with optical and electrical connections;

Figure 1:
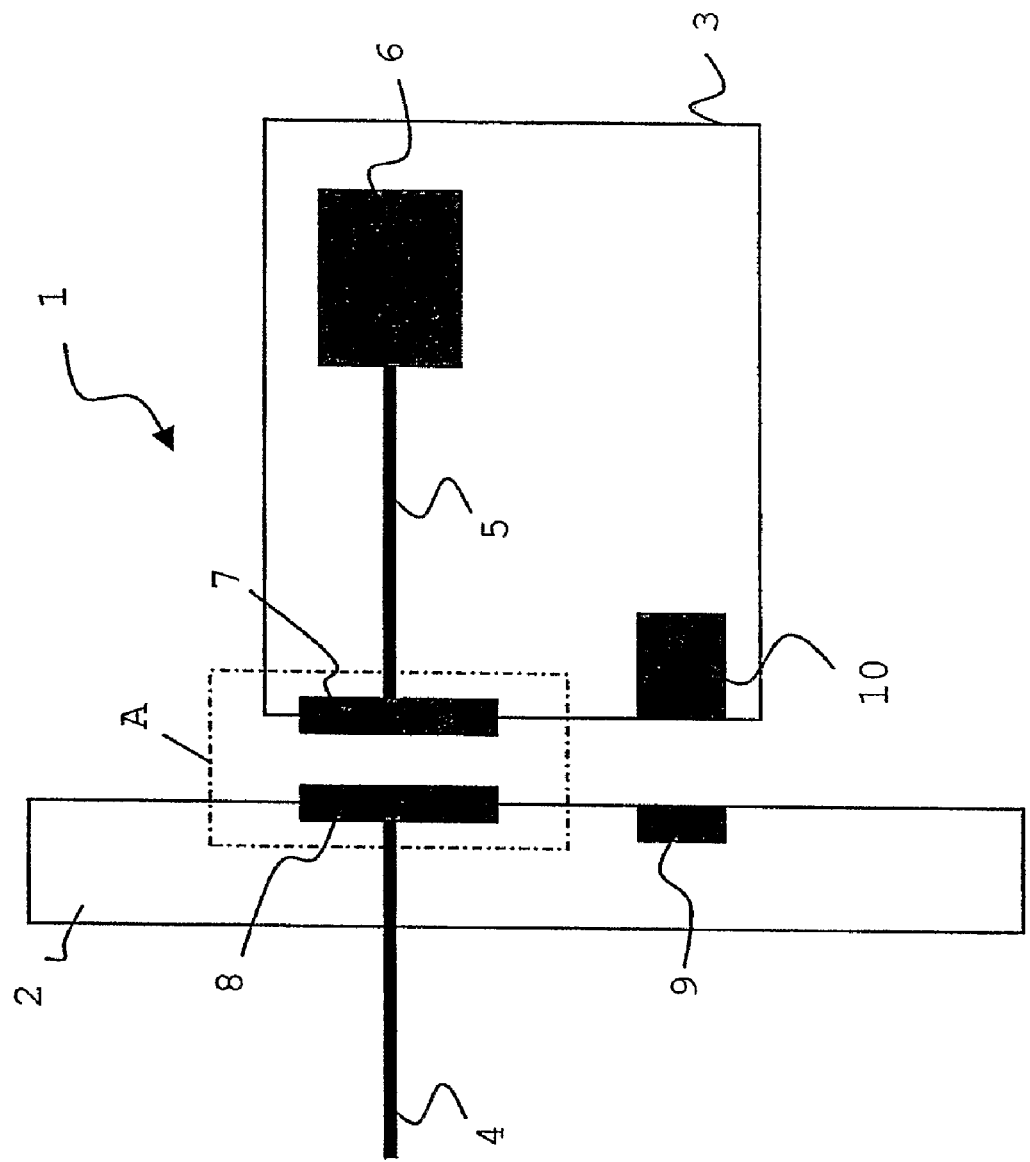

FIG. 1 displays a schematical illustration of an optical connector system 1 comprising a backpanel 2 and a substrate 3. Optical communication may be established via optical cables 4, 5 with a component 6 on the substrate 3. The optical communication may involve a first interface part 7 and a second interface part 8 to establish an optical interface for the optical communication. Further first electrical contacts 9 and second electrical contacts 10 are respectively provided at the backpanel 2 and the substrate 3 to allow transmission of electrical signals. As alignment is of crucial importance to provide a low loss optical interface, it is highly preferred for such optical connector systems 1 that the optical interfaces are completed before the electrical connections between the first and second electrical contacts 9, 10 are established, because the latter may otherwise disturb the alignment for the optical interface.

Figure 2:
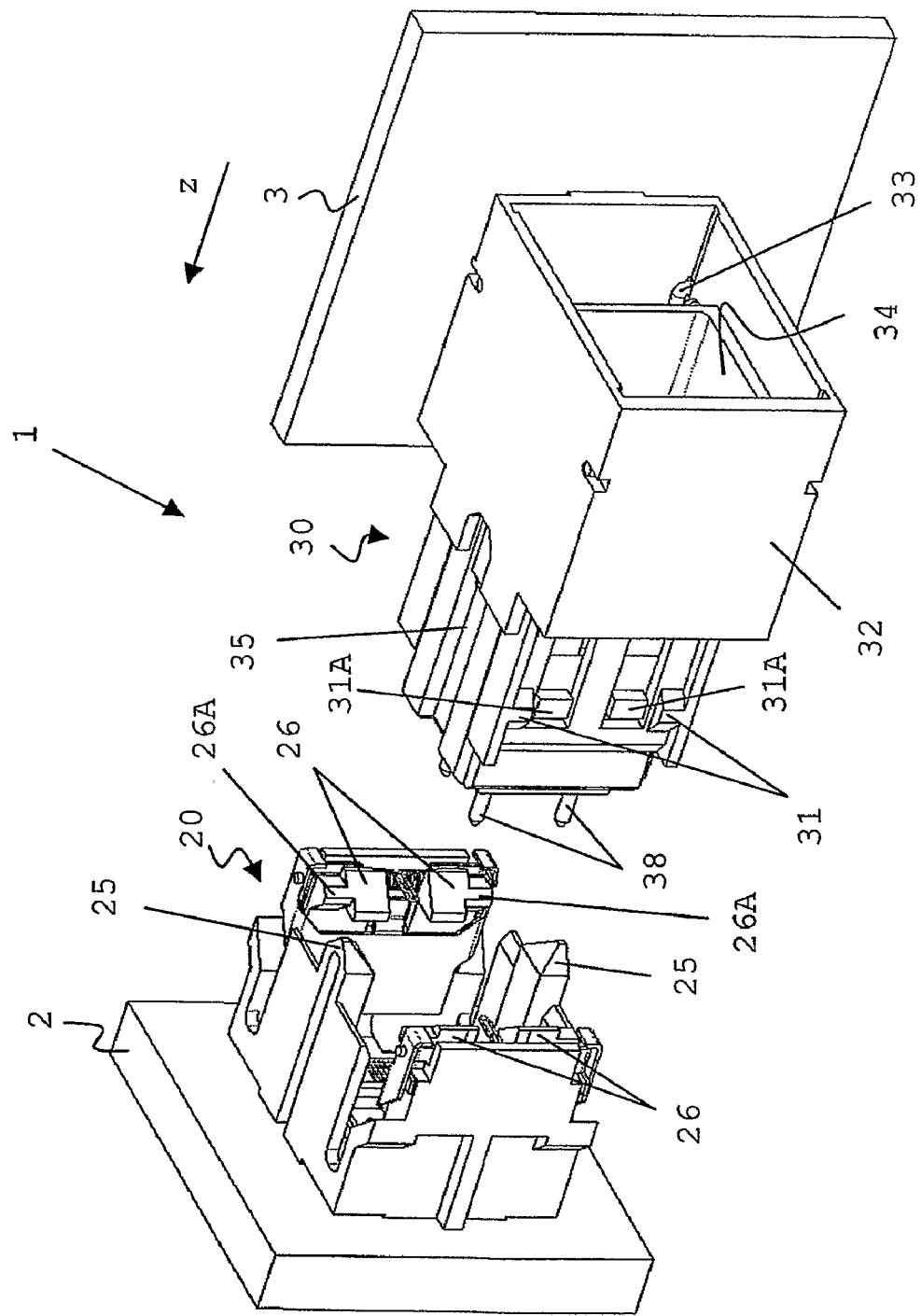
FIG. 2 shows an optical connector system according to an embodiment of the invention.

FIG. 2 shows a detailed view of the dashed area A of the optical connector system 1 of FIG. 1 comprising a backpanel housing assembly 20 mounted on the backpanel 2 and a substrate housing assembly 30 attached to the substrate 3. Detailed illustrations of the backpanel housing assembly 20 and the substrate housing assembly 30 are provided in FIG. 3 respectively FIGS. 4 and 5.

Figure 3:
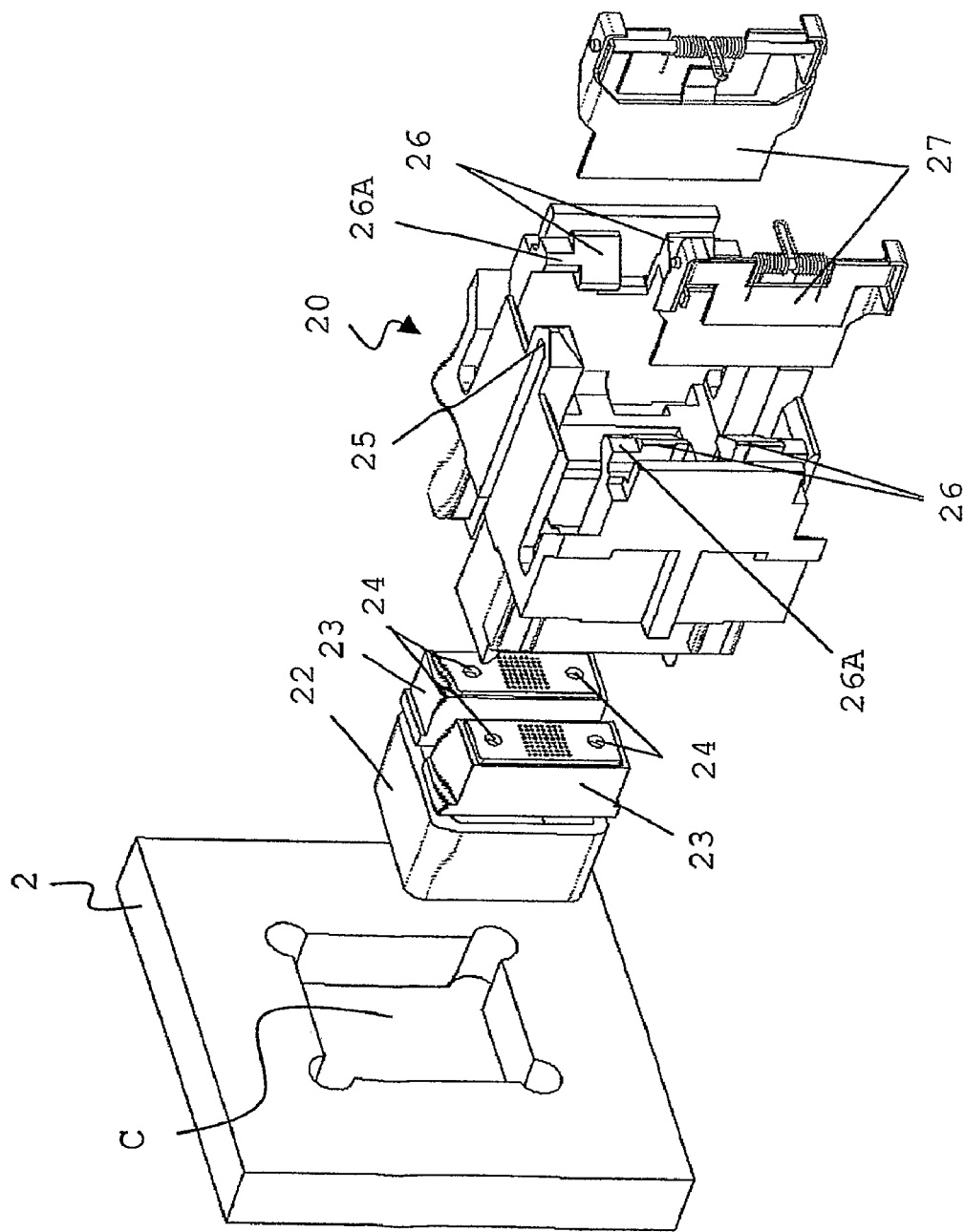
FIG. 3 shows an exploded view of the backpanel housing assembly of the optical connector system of FIG. 2.

FIGS. 2 and 3 shows a backpanel 2 with a hole or cavity C to allow external optical connections for the optical cable 4. A locking clip 22 is provided to mount the ferrule parts 23 in the cavity C. The ferrule parts 23 comprise a two-dimensional array of holes for optical fibres and thus constitute the second optical interface part 8 of FIG. 1. The ferrule parts 23 may e.g. be polymer optical fibre (POF) ferrule parts. The advantage of using polymer fibres is that a smaller bending radius can be used resulting in smaller dimensions for the optical system. However, the optical system according to the invention may use glass fibres as well. The ferrule parts 23 further comprise alignment elements 24, e.g. holes, to align the second interface part 8 with the first interface part 7 at the side of the substrate as shown in more detail in FIG. 6. The locking clip 22 and/or the ferrule parts 23 may be part of the optical cable 4 while being connectable to the backplane housing assembly 20 or be attached to the backplane 2 allowing insertion of the optical cable 4.

The backpanel housing assembly 20 has a bottom portion that is at least partly open to at least receive a part of the ferrule parts 23. The backpanel housing assembly 20 may further be shaped or comprise mounting elements to mount the backpanel housing assembly 20 to the backpanel 2. The backpanel housing assembly 20 may further comprise guiding elements 25 facilitating connection of the backpanel housing assembly 20 and the substrate housing assembly 30. Further the backpanel housing assembly 20 comprises locking elements 26 that cooperate with corresponding elements 31A of the substrate housing assembly 30. Finally the backpanel housing assembly 20 is formed such that it may accommodate or attach shutters 27 for safety reasons.

Figure 4:
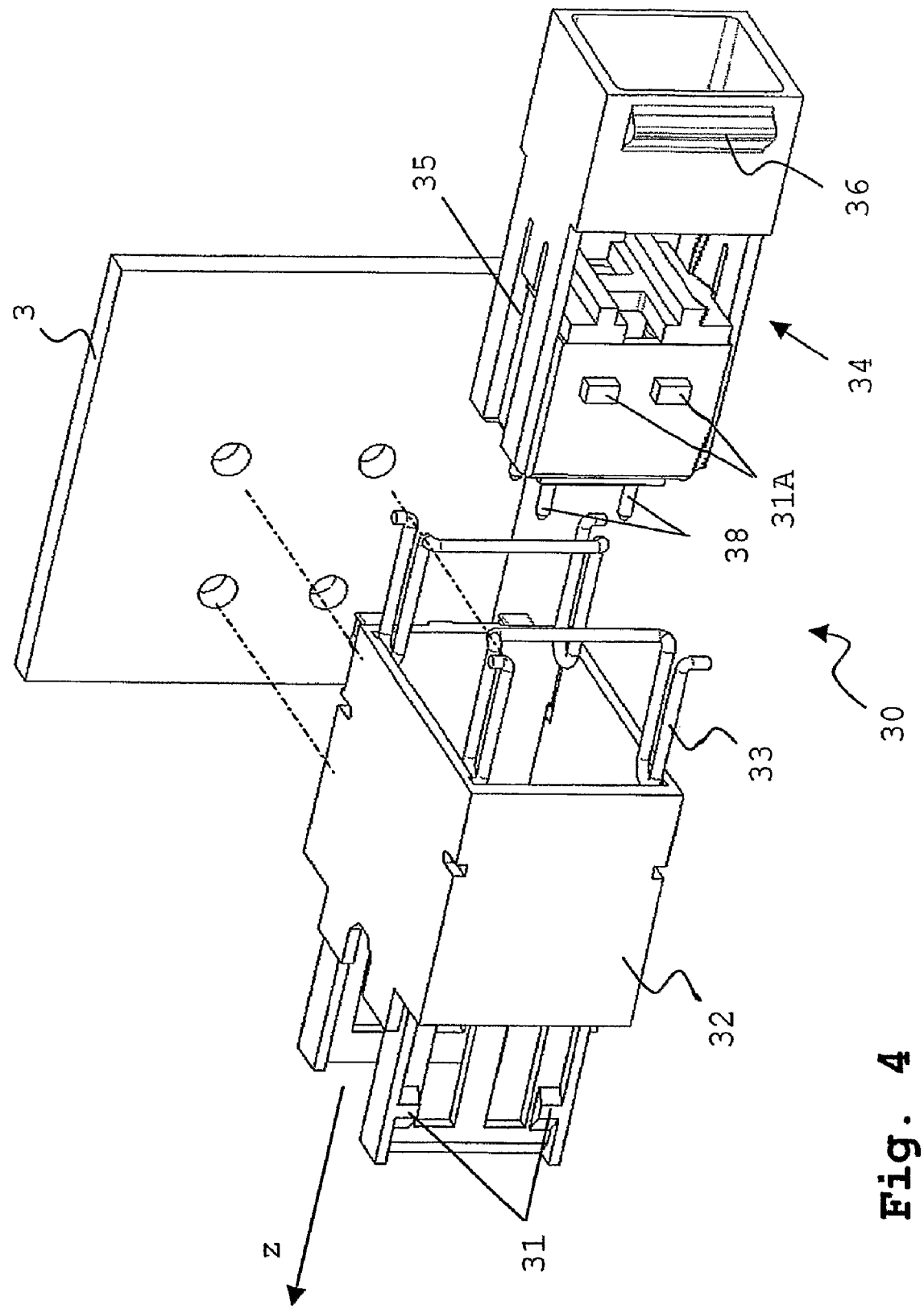
FIG. 4 shows an exploded view of the substrate housing assembly of the optical connector system of FIG. 2.

FIGS. 2 and 4 further illustrate a substrate housing assembly 30 mounted on a substrate 3 according to an embodiment of the invention. The substrate housing assembly 30 comprises an outer substrate housing 32, a biasing arrangement 33 and a further housing or insert 34.

The insert 34 comprises guiding structures 35 adapted to cooperate with the guiding elements 25 of the backpanel housing assembly 20. The outer substrate housing 32 comprises lifter elements 31 adapted to cooperate with the lifter elements 26A of the backpanel housing assembly 20.

The biasing arrangement 33 may comprise a suitably shaped spring that is attached to the substrate housing 32. The spring 33 cooperates with a protrusion 36 of the insert 34 as will be discussed in detail with reference to FIG. 6. Alternatively the spring 33 may be attached to the insert 34 and cooperate with one or more suitable parts of the outer housing 32.

Figure 5:
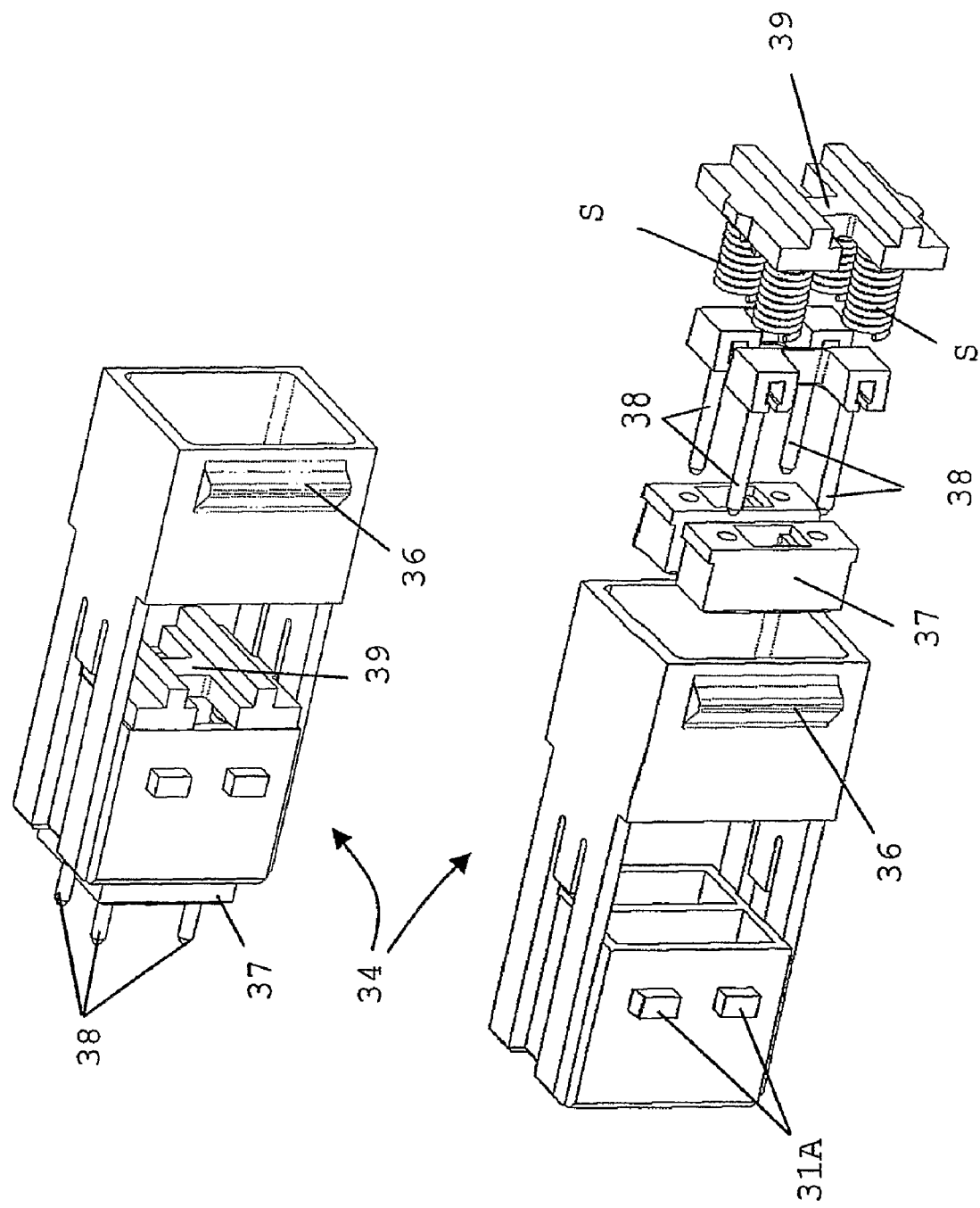
FIG. 5 shows an exploded view of the further housing of the substrate housing assembly of FIG. 4, and FIGS. 6A-6D show cross-sections of the optical connector system of FIG. 2 at several stages of connection.

FIG. 5 shows a more detailed illustration of the insert 34 in an assembled state and in exploded view of FIGS. 2 and 4. The insert 34 accommodates ferrule parts 37 wherein optical fibres of a cable 5 (not shown in FIG. 5) terminate for forming the first interface part 7 of the optical interface to be established on connection with the ferrule parts 23 at the side of the backpanel 20. The ferrule parts 37 comprise holes to have inserted pins 38 as alignment elements for aligning the ferrule parts 23 and 37 by cooperation with the alignment holes 24. The arrangement is maintained in position by a closing cap 39 employing springs S such that the ferrule parts 37 protrude from the front side of the insert 34.

In FIGS. 6A-6D the operation on connection (from left to right in the drawing) of the optical connector system 1 according to an embodiment of the invention is illustrated. Details of the insert 34 as displayed in FIG. 5 have been omitted for reasons of clarity. The z-direction of the system is indicated in the FIGS. 6A-6D and extends parallel to the normal of the backplane 2.

First the substrate housing assembly 30 mounted on the substrate 3 approaches the backpanel housing assembly 20 mounted on the backpanel 2. The backpanel 2 comprises a second interface part 8 formed by the ferrule parts 23 having alignment elements 24. The insert 34 protrudes from the substrate housing 32 and may be initially prevented to slip into the housing 32 by means of the spring element 33. The mating side of the insert 34 comprises the ferrule parts 37 and the pins 38 and is inserted into the backpanel housing assembly 20.

Subsequently in FIG. 6B the optical interface is formed as the first ferrule parts 23 and the second ferrule parts 37 mate assisted by the cooperating alignment elements 24 and 38. The leading parts of the lifter elements 31 of the substrate housing 32 deflect the corresponding lifter elements 26A of the backpanel housing assembly 20. The spring element 33 cooperates with the protrusions 36 of the insert 34 to create a spring load or bias allowing the application of force to form the optical interface. Now the locking element 26 of the back panel housing 20 locks behind the corresponding locking element 31A of the insert 34. At this stage the electrical contacts 9, 10 have not yet been made such that the alignment of the optical interface is not disturbed by the formation of the electrical contact.

In the next stage illustrated in FIG. 6C the substrate 3 further approaches the backpanel 2 to mate the first and second electrical contacts 9 and 10 without affecting the locked optical interface of FIG. 6B. This is achieved by having an insert 34 that is slidably mounted in the z-direction with respect to the substrate housing 32. The spring element 33 no longer cooperates with the protrusions 36 such that the insert 34 is released as clearly illustrated in FIG. 6C. Accordingly virtually no spring load remains for the backpanel 2.

Finally in FIG. 6D the backpanel housing assembly and the substrate housing assembly are in the final position and both the optical interfaces and electrical contacts have been formed.

It should be appreciated that the invention is by no means limited to the above described embodiments, as e.g. the second interface part 8 may be integrated in the backpanel 2.

The invention claimed is:

1. Optical connector system comprising:
   at least one substrate housing assembly attachable to a substrate; and
   at least one backpanel housing assembly for establishing an optical interface with the at least one substrate housing assembly;
   wherein the substrate housing assembly comprises an outer housing, a further housing slidably mounted in a z-direction with respect to the outer housing, and a biasing arrangement carried by one of the outer housing and the further housing cooperating with a biasing arrangement load means arranged on the other of the further housing and the outer housing to create an application force to form the optical interface;
   wherein the connector system is configured such that further movement of the outer housing in the z-direction toward the backpanel housing assembly in respect to the further housing is capable to disengage the biasing arrangement from the biasing arrangement load means.

2. Optical connector system according claim 1, wherein that upon completion of the optical interface, the further housing is adapted to be locked to the backpanel housing assembly.

3. Optical connector system according claim 1, wherein said further housing is at least partly accommodated within said substrate housing assembly.

4. Optical connector system according to claim 1, wherein said substrate housing assembly comprises a first interface part for establishing said optical interface with a second interface part at said backpanel housing assembly.

5. Optical connector system according to claim 4, wherein said second interface part is integrated in said backpanel.

6. Optical connector system according to claim 4, wherein said backpanel comprises a cavity (C) for forming said second interface part at said backpanel housing assembly.

7. Optical connector system according to claim 4, wherein said further housing comprises said first interface part.

8. Optical connector system according to claim 4, wherein said further housing comprises at least one ferrule assembly for optical fibres for said first interface part and alignment elements to align said first interface part and said second interface part.

9. Optical connector system according to claim 1, wherein said backpanel housing assembly and said substrate housing assembly comprise locking elements adapted to lock said housings after completion of said optical interface.

10. Optical connector system according to claim 1, wherein said backpanel comprises one or more first electrical contacts and said substrate comprises one or more second electrical contacts and said optical connector system is further arranged to establish electrical connections between said first and second electrical contacts substantially after completion of said optical interface.

11. Substrate housing assembly for a substrate adapted for mounting to a backpanel housing assembly of a backpanel to establish an optical interface for optical communication between said substrate and said backpanel, wherein the substrate housing assembly comprises an outer housing, a further housing with a mating side forming a first interface part for said optical interface, and a biasing arrangement, wherein the further housing is slidably mounted in a z-direction with respect to the outer housing, and wherein the biasing arrangement is carried by one of the outer housing and the further housing cooperating with a biasing arrangement load means arranged on the other of the further housing and the outer housing to create an application force to form the optical interface;

wherein the substrate housing assembly is configured such that further movement of the outer housing in the z-direction toward the backpanel housing assembly in respect to the further housing is capable to disengage the biasing arrangement from the biasing arrangement load means.

12. Substrate housing assembly according to claim 11, wherein that upon completion of the optical interface, the further housing is adapted to be locked to the backpanel housing assembly.

13. An optical connector system comprising:

a backpanel housing assembly comprising a first lifter element and a first locking element; and a substrate housing assembly configured to establish an optical interface with the backpanel housing assembly, wherein the substrate housing assembly comprises an insert housing and an outer housing;

wherein the insert housing is movably mounted inside the outer housing, wherein the insert housing comprises a second locking element and a protrusion, wherein the second locking element is adapted to engage with the first locking element, and wherein the protrusion is proximate a first end of the substrate housing assembly;

wherein the outer housing comprises a second lifter element and a spring element, wherein the second lifter element is adapted to engage with the first lifter element, wherein the second lifter element is proximate a second opposite end of the substrate housing assembly, wherein the spring element is adapted to cooperate with the protrusion, and wherein the spring element extends between an inner surface of the outer housing and an outer surface of the insert housing.

14. An optical connector system according to claim 13 wherein the spring element is adapted to cooperate with the protrusion to create an application force to form the optical interface.

* * * * *